US 6,542,807 B2

(12) United States Patent
Bienias et al.

(10) Patent No.: US 6,542,807 B2
(45) Date of Patent: *Apr. 1, 2003

(54) DEVICE FOR REPRESENTING A CONTROL SITUATION DETERMINED BY A MOTOR VEHICLE DISTANCE CONTROL DEVICE

(75) Inventors: Robert Bienias, Rüsselsheim (DE); Sascha Heinrichs-Bartscher, Sulzbach (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,058

(22) Filed: Dec. 21, 1999

(65) Prior Publication Data

US 2001/0039471 A1 Nov. 8, 2001

(30) Foreign Application Priority Data

Dec. 22, 1998 (DE) .......................... 198 59 345

(51) Int. Cl.⁷ .......................... G08G 1/16; G01S 13/93; G06F 15/00
(52) U.S. Cl. .......................... 701/96; 701/93; 340/903; 180/169
(58) Field of Search .......................... 701/96, 93, 301; 340/903, 988, 435, 436; 180/169, 168, 170; 342/70, 71; 367/96, 909

(56) References Cited

U.S. PATENT DOCUMENTS

| 4,158,841 A | * 6/1979 | Wiichner et al. | ......... 343/7 VM |
|---|---|---|---|
| 4,537,271 A | * 8/1985 | Ito et al. | ..................... 180/131 |
| 5,465,079 A | * 11/1995 | Bouchard et al. | ........... 340/576 |
| 5,467,283 A | * 11/1995 | Butsuen et al. | ............. 364/461 |
| 5,467,284 A | * 11/1995 | Yoshioka et al. | ........... 364/461 |
| 5,479,173 A | * 12/1995 | Yoshioka et al. | ............. 342/70 |
| 5,572,428 A | * 11/1996 | Ishida et al. | ................. 364/461 |
| 5,642,093 A | * 6/1997 | Kinoshita et al. | ........... 340/439 |
| 5,670,953 A | * 9/1997 | Satoh et al. | ................. 340/903 |
| 5,790,403 A | * 8/1998 | Nakayama | ........... 364/424.033 |
| 5,959,569 A | * 9/1999 | Khodabhai | .................... 342/70 |
| 6,026,347 A | * 2/2000 | Schuster | ..................... 701/301 |
| 6,032,097 A | * 2/2000 | Iihoshi et al. | .................. 701/96 |
| 6,070,682 A | * 6/2000 | Isogai et al. | ................ 180/167 |

FOREIGN PATENT DOCUMENTS

| DE | 19654538 | 7/1997 |
| JP | 08305999 | 11/1996 |
| JP | 09166452 | 6/1997 |

* cited by examiner

Primary Examiner—Tan Q. Nguyen
Assistant Examiner—Dalena Tran
(74) Attorney, Agent, or Firm—Martin A. Farber

(57) ABSTRACT

A device for representing on a display device a control situation determined by a motor vehicle distance control device, the distance control device being connected to a sensor which detects the coordinates and the relative speed of the obstacles located ahead of the motor vehicle and relays them to the distance control device, which determines the expected lane of the motor vehicle, the distance control device determining from these data a control object with reference to which the distance of the motor vehicle is controlled. Referring lso a device referring the multiplicity of the data required for distance control in a motor vehicle can be checked in a simple way for their correctness, the distance control device (3) is connected to a display control device (14) which converts the data detected by the sensor (9) and calculated by the distance control device (10) into an approximately true-to-scale plan view of the control situation ahead of the vehicle (1), which is displayed on the display device (15).

9 Claims, 3 Drawing Sheets

DEVICE FOR REPRESENTING A CONTROL SITUATION DETERMINED BY A MOTOR VEHICLE DISTANCE CONTROL DEVICE

FIELD AND BACKGROUND OF THE INVENTION

The invention relates to a device for representing on a display device a control situation determined by a motor vehicle distance control device, the distance control device being connected to a sensor which detects the coordinates and the relative speed of the obstacles located ahead of the motor vehicle and relays them to the distance control device, which determines the expected lane of the motor vehicle, the distance control device determining from these data a control object with reference to which the distance of the motor vehicle is controlled.

In the case of a distance control unit for motor vehicles, a multiplicity of data are made available both by a distance sensor and by the electronic distance control system itself for the purpose of setting the distance of the motor vehicle to be controlled from a vehicle driving in front. The distance sensor in this case detects the obstacles situated in the sensor beam, and determines the space coordinates and the speed relative to the motor vehicle to be controlled. The distance control unit determines an expected driving corridor for the vehicle to be controlled. Moreover, the electronic distance control system determines from the obstacles detected by the distance sensor an obstacle with reference to which the distance of the motor vehicle is to be controlled. The control situation on which the resulting distance value is based and which is determined by the distance control device must be checked with regard to its correct mode of operation.

In order to monitor the reliability of the mode of operation of the electronic control system, it is customary, in addition, to observe the traffic situation via video cameras, and to draw conclusions therefrom on the correct mode of operation of the distance control device. It is necessary for this purpose to install an additional detection system, and this makes checking of the mode of operation of the distance control device more expensive.

SUMMARY OF THE INVENTION

It is therefore the object of the invention to specify a device by means of which the multiplicity of the data required for distance control in a motor vehicle can be checked in a simple way for their correctness.

This object is achieved according to the invention wherein the distance control device is connected to a display control device which converts the data detected by the sensor and calculated by the distance control device into an approximately true-to-scale plan view of the control situation ahead of the vehicle, and outputs this to the display device for display.

The advantage of the invention consists in that all the values determined by the distance control device and by the distance sensor can be represented on a display screen and can be compared by the operator with the actual control situation ahead of the motor vehicle. A second autonomously operating comparing device is dispensed with completely.

For simulation purposes, the data in the distance control device can be varied, this variation becoming immediately visible on the display device.

The plan view advantageously represents all the obstacles detected in the overall detection zone of the sensor beam, and their arrangement in the expected lane of the motor vehicle. In this case, the coordinate system of the display device corresponds to the maximum detection zone of the sensor beam. It is possible in this way also to visualize clearly settings which cannot be detected with the naked eye.

In a development, the distance control device is connected via a data adaptation device to the display control device, the data adaptation device having an arithmetic unit which is connected to a plurality of interfaces, each interface having an unchangeable or a freely programmable configuration, and the distance control device being connected to a first interface corresponding to its electronic configuration, and the display control device being connected to a second selected interface, and upon receiving a control command the arithmetic unit activating one of a plurality of adaptation programs stored in a memory which adapts to one another the data to be exchanged by the display control device and the distance control device.

This has the advantage that it is possible to dispense with the adaptation circuits which have previously been necessary as a function of the electronic architecture of the distance control unit. The correct setting of the data adaptation unit is realized easily for each electronic configuration of the distance control unit by means of a simple software logic operation.

It is therefore possible for each distance control unit to be connected without any problem, irrespective of which electronic configuration it may have, to one and the same display control unit.

The data adaptation device in this case takes over the function of an adapter which freely couples electronic devices of any type.

In order for the data adaptation unit to be freely configurable, for the purpose of outputting and inputting data from and into the distance control device the arithmetic unit is connected to a serial interface or a bus interface, while the data input and data output is performed with the aid of the display control device via a serial or parallel interface.

It is especially advantageous in this case that the selection of the data which are to be transmitted by the distance control device to the display control device can be configured by the display control device by virtue of the fact that the display control device outputs the addresses to the distance control device whose data are to be transmitted.

In a refinement, for simulation purposes the display control device can input changes in the control situation into the distance control device, the data newly calculated by the distance control device being represented as a plan view of the control situation on the display device. The distance control device determines the resultant new control situation, taking account of the sensor data and the vehicle data. In particular, account is taken in this case of the control situation in conjunction with a lane width which is narrower or wider by comparison with the original one. The mode of operation of the distance control system can be tested by this measure in the case of different circumstances.

Moreover, for simulation purposes specific objects detected by the sensor can be masked out of the display. When determining the lane, the distance control device behaves as if these objects had not been detected by the sensor beam, and determines a control situation without these objects.

BRIEF DESCRIPTION OF THE DRAWINGS

The invention permits numerous embodiments. One of these is to be explained in more detail with the aid of the figures represented in the drawings, in which.

DETAILED DESCRIPTION OF THE PREFERRED EMBODIMENT

Figure 1:
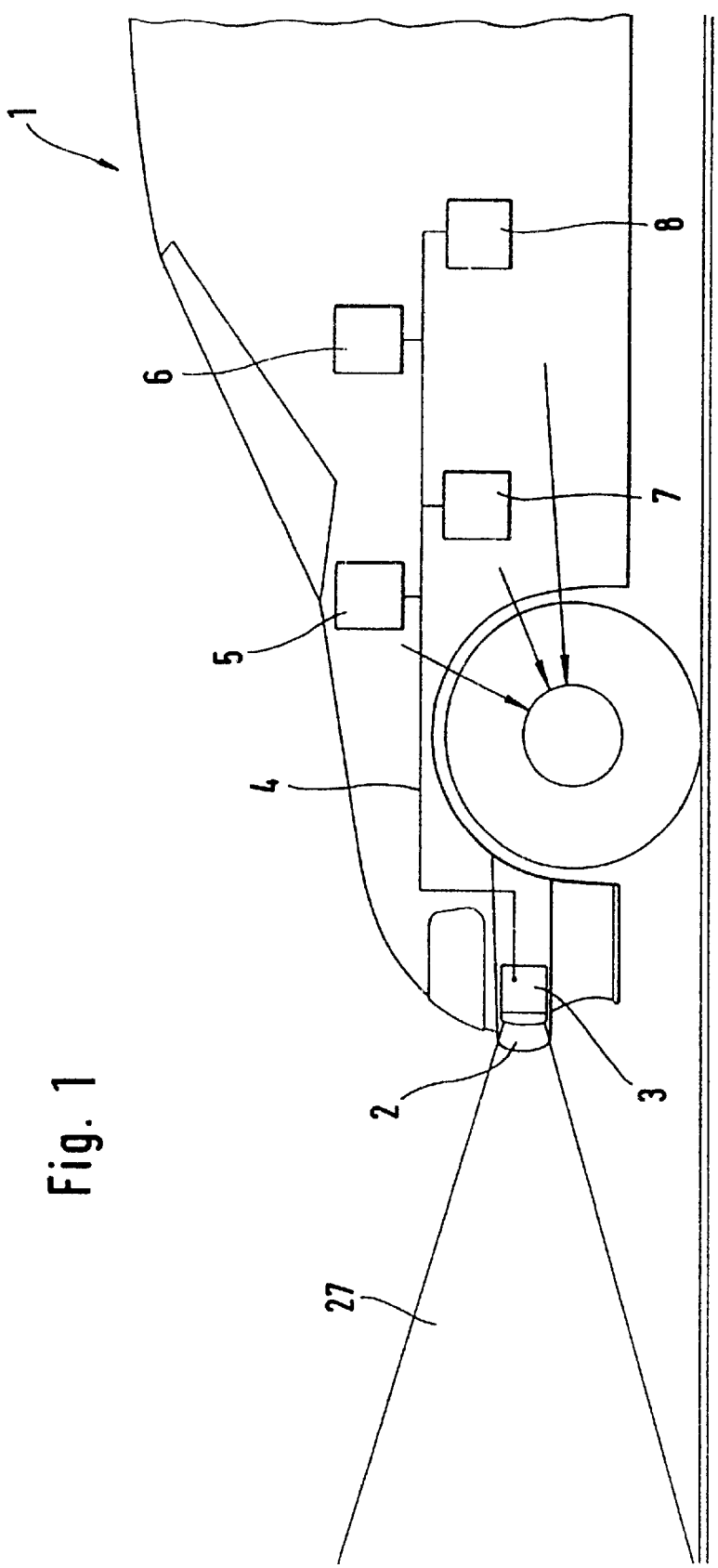
FIG. 1 shows a distance control device in a motor vehicle.

Identical features are marked with identical reference numerals. Arranged on the fender 2 of a motor vehicle 1 in FIG. 1 is an automatic speed and distance control system 3 for keeping the safety distance of motor vehicles, which includes a radar sensor and the distance control device. The automatic speed and distance control system 3 is connected via a bus system 4 present in the vehicle 1 to the engine control system 5, the brake 7 or the transmission 8. By intervening in the engine control system 5, the brake 7 or the transmission 8, electronic commands automatically control the distance and the speed of the motor vehicle 1 to be controlled when the latter approaches a slower vehicle driving in front. The current speed and the distance from the vehicle driving in front are displayed via a display device 6, which is likewise driven by the speed and distance control system 3 via the bus system 4, preferably a CAN bus.

Figure 2:
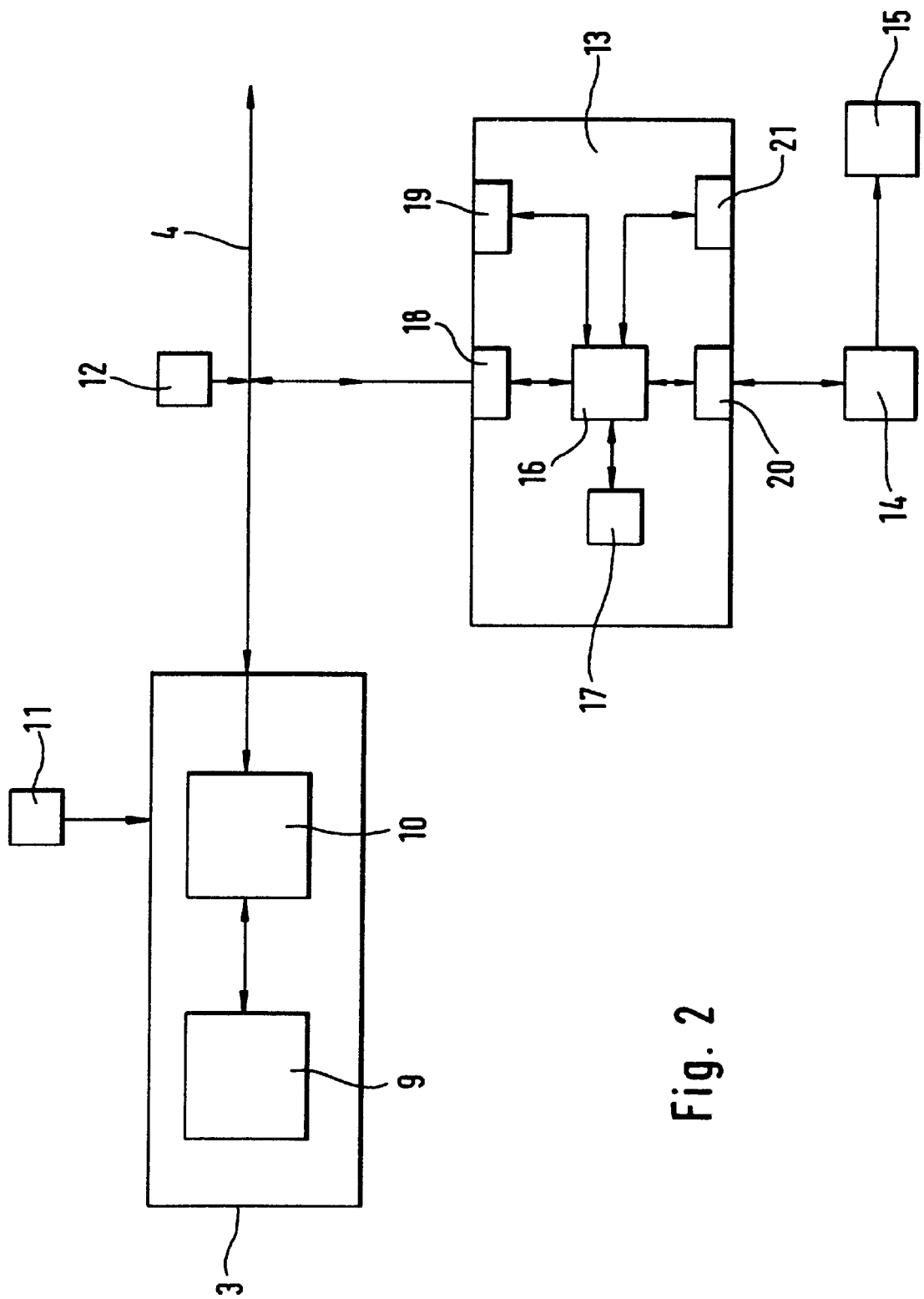
FIG. 2 shows an apparatus according to the invention for representing the control situation.

AS may be seen from FIG. 2, the speed and distance control system comprises a radar sensor 9 emitting a sensor beam. The radar sensor 9 is connected to the distance control device 10. A yaw rate sensor 11 supplies measured values to the distance control device 10.

In addition to the speed and distance control system 3, there is also connected to the bus system 4 of the vehicle 1 a rotational-speed sensor 12 which supplies information on the current speed of the motor vehicle. Moreover, the bus system 4 is connected to a data adaptation device 13 which, in turn, is connected to a PC 14 which drives a display device in the form of a monitor 15.

The data adaptation device 13 comprises a microprocessor 16 which is connected to a read-only memory 17 and a plurality of interfaces 18, 19, 20, 21. The interfaces are all permanently configured. Thus, the interface 18 is a bus interface, and the interface 19 is a serial interface. Depending on the way in which the data are transmitted inside the motor vehicle 1, the speed and distance control system 3 is connected to one of the two interfaces 18, 19, and thus connected to the PC 14 via the data adaptation device 13.

If the adaptation device 13 is to serve to adapt the data made available by the PC 14 to the databus 4 of the motor vehicle 1, or to adapt the data transmitted by the databus 4 to the PC 14, the parallel interface of the PC 14 is connected to the parallel input interface 20, connected to the microprocessor 16, of the data adaptation device 20. The bus line 4 is led in this case to the CAN bus interface 18. In the case of the transmission of data and/or operating programs, the data which the microprocessor 10 reads out of the speed and distance control unit 10 via the bus system 4 are configured in the PC 14. The addresses of these data are input by the PC 14 into the microprocessor 16 via the parallel interface 20. Before the start of transmission, the microcomputer 16 activates a configuration program which formats the data transmitted to the PC 14 by the electronic distance control system 10 such that they can be processed by the PC 14.

It is just the same when data are to be transferred from the PC 14 to the distance control device 10.

During the normal operating state of the speed and distance control system 3, every 60 milliseconds the sensor 9 emits sensor signals in the driving direction of the vehicle 1 which are reflected by the obstacles and vehicles which are located in the signal beam 27 of the sensor 9. A signal conditioning circuit integrated in the sensor 9 uses these reflected signals to determine the distance and the relative speed of the obstacles located ahead of the vehicle.

These measurement results are evaluated by the distance control device 10 which relays them to the PC 14 via the bus system 4 of the motor vehicle.

Object data (distance, relative speed and control data) from which the distance control device 10 determines the expected driving corridor of the control object are determined per unit of time. The data coming from the distance control device 10 are read into the data adaptation circuit 13 via the CAN bus 4.

Figure 3:
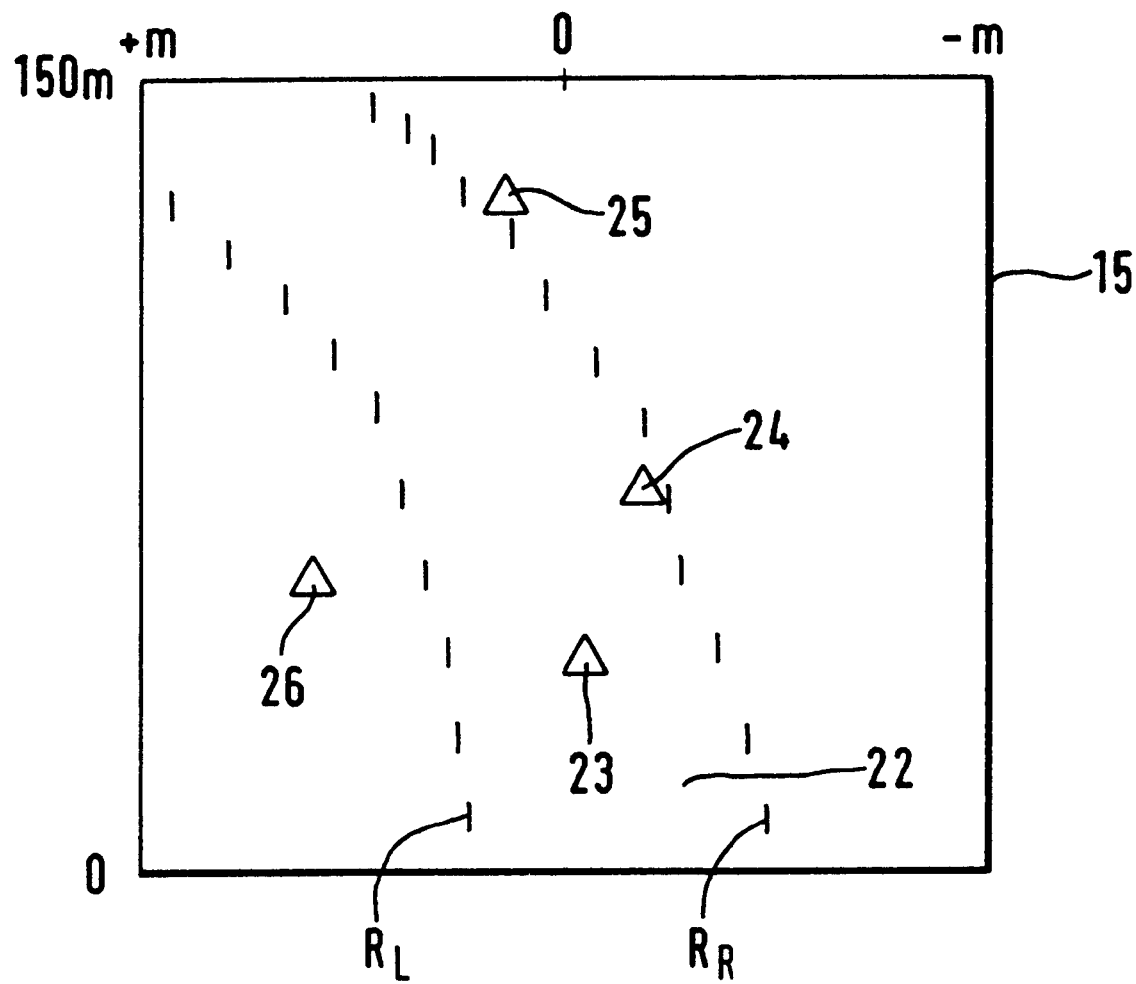
FIG. 3 shows a representation of the control situation on a monitor.

The objects 23, 24, 25 and 26 thus determined by the sensor 9 are represented on the monitor 15 (FIG. 3). The distance of the obstacles 23, 24, 25, 26 from the vehicle 1 is specified in this case by the radar sensor 9 in the form of coordinates, the sensor 9 being arranged at the point x=0 and y=0.

The display coordinate system of the monitor 15 correlates in this case with the coordinate system of the sensor beam 27. Thus, a distance of 0–155 meters, which corresponds to the maximum detection zone of the sensor beam 27, is represented on the x-coordinate. A width of minus to plus 13 meters is represented on the y-coordinate, and this corresponds approximately to the visual range of the sensor 9 with its sensor beam 27.

The positional data x, y of each obstacle 23, 24, 25, 26 which are determined by the sensor 9 are converted in proportion with the monitor dimensions and reproduced in a fashion true to the distance. Moreover, the driving corridor 22 determined by the distance control device 10 is represented, being calculated as follows:

$$dY_L = (dX)^2/2R_L \text{ and } dY_R = (dX)^2/2R_R$$

X is a perpendicular distance from the motor vehicle forward, selectable between 0 to 155 m, while $R_R$ and $R_L$ represent the radii of curvature of the right-hand and the left-hand vehicle wheel.

The radius of curvature of each front wheel of the vehicle is determined in order to determine the expected lane of the motor vehicle to be controlled. The radius of curvature of the right-hand front wheel $R_R$ is determined from the speed $V_R$ of the front wheel by the yaw rate which is determined by the yaw rate sensor 11. In a similar way, the radius of curvature $R_L$ of the left-hand front wheel is determined by the speed $V_L$ of the left-hand radius by the measured yaw rate.

The driving corridor is formed as a function of the radii $R_R$ and $R_L$ of the right-hand and left-hand front wheels. The width of the driving corridor in this case has at least the track width of the two wheels.

In order to determine the driving corridor very accurately, the radii of curvature of the two rear wheels are also calculated, in addition. The radii of curvature of the right-hand and left-hand rear wheels are determined by analogy with the front wheels by dividing the speed of the respective wheel by the yaw rate.

In this way, a plan view of the control situation detected by the speed and distance control system 3 can be easily achieved so that the operator obtains a spatial presentation thereof. In this case, either all the detected objects or only the moving objects are displayed.

We claim:

1. A device for representing on a display device a control situation determined by a motor vehicle distance control device, the distance control device being connected to a sensor which detects the coordinates of the obstacles located ahead of the motor vehicle and relays them to the distance control device, which determines the expected lane of the motor vehicle, the distance control device determining from these data a control object with reference to which the distance of the motor vehicle is controlled, wherein the distance control device (3) is connected to a display control device (14) which converts the data detected by the sensor (9) including locations of the obstacles located ahead of the vehicle and data including the expected lane calculated by the distance control device (10) into an approximately true-to-scale plan view of the control situation ahead of the vehicle (1), which is displayed on the display device (15); and wherein the display device (15) presents a plan view of the control situation which is suitable for viewing by an operator of the vehicle during a driving of the vehicle, and the plan view includes marks identifying a driving corridor (22) of the motor vehicle, the plan view presenting further marks identifying obstacles (23, 24, 25, 26) located ahead of the motor vehicle.

2. The device as claimed in claim 1, wherein the plan view represents the obstacles (23, 24, 25, 26) detected in the overall detection zone of the sensor (9), and their arrangement in the expected lane (22) of the vehicle (1).

3. The device as claimed in claim 1, wherein the distance control device (10) is connected via a data adaptation device (13) to the display control device (14), the data adaptation device device (13) having an arithmetic unit (16) which is connected to a plurality of interfaces (18, 19; 20, 21), each interface (18, 19; 20, 21) having an unchangeable or a freely programmable configuration, and the distance control device (10) being connected to a first interface (18, 19) corresponding to its electronic configuration, and the display control device (14) being connected to a second selected interface (20, 21), and upon receiving a control command the arithmetic unit (16) activating one of a plurality of adaptation programs stored in a memory (17) which adapts to one another the data to be exchanged by the display control device (14) and the distance control device (10).

4. The device as claimed in claim 3, wherein for the purpose of outputting and inputting data from and into the distance control device (10) the arithmetic unit (16) is connected to a serial interface (19) or a bus interface (18), while the data input and data output is performed with the aid of the display control device (14) via a serial (21) or parallel interface (20).

5. The device as claimed in claim 4, wherein the selection of the data which are transmitted by the distance control device (10) can be configured in the display control device (14).

6. The device as claimed in claim 5, wherein for simulation purposes the display control device (14) can input changes in the control situation into the distance control device (10), the data newly calculated by the distance control device (10) being represented as a plan view of the control situation on the display device (15).

7. The device as claimed in claim 6, wherein a lane width is changed for simulation purposes.

8. The device as claimed in claim 6, wherein for simulation purposes specific objects detected by the sensor (9) are not taken into account when determining the lane.

9. The device as claimed in claim 1, wherein the sensor further detects the relative speed of the obstacles located ahead of the motor vehicle and relays the detected relative speed to the distance control device, the latter determining further said control object from the relative speed.

* * * * *